(12) United States Patent
Xu

(10) Patent No.: US 12,014,730 B2
(45) Date of Patent: Jun. 18, 2024

(54) VOICE PROCESSING METHOD, ELECTRONIC DEVICE, AND STORAGE MEDIUM

(71) Applicant: BEIJING XIAOMI MOBILE SOFTWARE CO., LTD., Beijing (CN)

(72) Inventor: Xiangyan Xu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 73 days.

(21) Appl. No.: 17/322,238

(22) Filed: May 17, 2021

(65) Prior Publication Data

US 2022/0165258 A1    May 26, 2022

(30) Foreign Application Priority Data

Nov. 23, 2020 (CN) .......................... 202011324752.5

(51) Int. Cl.
*G10L 15/20* (2006.01)
*G10L 15/02* (2006.01)

(52) U.S. Cl.
CPC .............. *G10L 15/20* (2013.01); *G10L 15/02* (2013.01); *G10L 2015/025* (2013.01)

(58) Field of Classification Search
CPC ....................................................... G10L 25/78
See application file for complete search history.

(56) References Cited

U.S. PATENT DOCUMENTS

| 6,985,863 B2* | 1/2006 | Itoh | G10L 15/187 |
| | | | 704/E15.02 |
| 9,437,186 B1* | 9/2016 | Liu | G10L 15/05 |
| 10,657,952 B2* | 5/2020 | Hofer | G10L 15/16 |
| 10,714,122 B2* | 7/2020 | Muchlinski | G10L 25/84 |

(Continued)

FOREIGN PATENT DOCUMENTS

EP          3210204 B1      10/2018

OTHER PUBLICATIONS

I. Hwang and J.-H. Chang, "End-to-End Speech Endpoint Detection Utilizing Acoustic and Language Modeling Knowledge for Online Low-Latency Speech Recognition," in IEEE Access, vol. 8, pp. 161109-161123, 2020, doi: 10.1109/ACCESS.2020.3020696. (Year: 2020).*

(Continued)

*Primary Examiner* — Richemond Dorvil
*Assistant Examiner* — Alexander G Marlow
(74) *Attorney, Agent, or Firm* — COZEN O'CONNOR

(57) ABSTRACT

A voice processing method includes: collecting a voice signal by a microphone of an electronic device, and signal-processing the collected voice signal to obtain a first voice frame segment; performing voice recognition on the first voice frame segment to obtain a first recognition result; in response to the first recognition result not matching a target content and a plurality of tokens in the first recognition result meeting a preset condition, performing frame compensation on the first voice frame segment to obtain a second voice frame segment; and performing voice recognition on the (Continued)

second voice frame segment to obtain a second recognition result. A matching degree between the second recognition result and the target content is greater than a matching degree between the first recognition result and the target content.

9 Claims, 3 Drawing Sheets

(56) References Cited

U.S. PATENT DOCUMENTS

| | | | | |
|---|---|---|---|---|
| 10,854,192 | B1* | 12/2020 | Maas | G10L 15/26 |
| 11,024,332 | B2* | 6/2021 | Qian | G10L 25/78 |
| 11,056,098 | B1* | 7/2021 | Gejji | G10L 15/193 |
| 11,062,696 | B2* | 7/2021 | Tadpatrikar | G10L 15/065 |
| 11,145,305 | B2* | 10/2021 | Minkin | G10L 15/22 |
| 2011/0082687 | A1 | 4/2011 | Pham | |
| 2015/0310879 | A1* | 10/2015 | Buchanan | G06F 40/284 |
| | | | | 704/235 |
| 2016/0358598 | A1* | 12/2016 | Williams | G10L 17/02 |
| 2016/0379632 | A1* | 12/2016 | Hoffmeister | G10L 25/87 |
| | | | | 704/253 |
| 2017/0069309 | A1* | 3/2017 | Aleksic | G10L 15/22 |
| 2019/0043529 | A1 | 2/2019 | Muchlinski et al. | |
| 2019/0318759 | A1* | 10/2019 | Doshi | G10L 15/04 |
| 2020/0117996 | A1* | 4/2020 | Chang | G06N 3/08 |
| 2020/0335091 | A1* | 10/2020 | Chang | G10L 15/22 |

OTHER PUBLICATIONS

Baiyang Liu, Bjorn Hoffmeister, Ariya Rastrow "Accurate Endpointing with Expected Pause Duration" retrieved from https://s3-us-west-2.amazonaws.com/amazon.jobs-public-documents/endpointer_interspeech_2015.pdf (Year: 2015).*

A. Stolcke and E. Shriberg, "Statistical language modeling for speech disfluencies," 1996 IEEE International Conference on Acoustics, Speech, and Signal Processing Conference Proceedings, Atlanta, GA, USA, 1996, pp. 405-408 vol. 1, doi: 10.1109/ICASSP.1996.541118. (Year: 1996).*

European Patent Application No. 21175838.8 extended Search and Opinion dated Nov. 9, 2021, 6 pages.

Indian Patent Application No. 202144022666 Office Action dated May 31, 2022, 5 pages.

European Patent Application No. 21175838.8, Office Action dated Feb. 13, 2024, 5 pages.

* cited by examiner

VOICE PROCESSING METHOD, ELECTRONIC DEVICE, AND STORAGE MEDIUM

CROSS REFERENCE TO RELATED APPLICATIONS

This application claims priority to Chinese Patent Application No. 202011324752.5, filed on Nov. 23, 2020, the content of which is incorporated herein by reference in its entirety.

TECHNICAL FIELD

The disclosure relates to voice processing technology, and in particular to a voice processing method and apparatus, an electronic device, and a storage medium.

BACKGROUND

With the gradual popularization of smart electronic devices, there are more and more applications for sound control to electronic devices, such as smart speakers, voice robots, mobile phones, wearable devices, smart homes, car navigators, etc. The voice interaction technology is greatly convenient to users for use of electronic devices. That is, the user may control the electronic device without actually operating the electronic device. For example, in the current voice wake-up application of electronic devices, the electronic device may be awakened by inputting wake-up keywords, so as to input voice control instructions. In this way, it is not necessary for the electronic device to be in an on-state all the time to receive the voice control instructions, thereby saving the powers of electronic device. In the wake-up applications, the success rate (that is, wake-up rate) of user voice interaction is an important indicator that affects user experience.

SUMMARY

According to a first aspect of the disclosure, a voice processing method includes: collecting a voice signal by a microphone of an electronic device, and signal-processing the collected voice signal to obtain a first voice frame segment; performing voice recognition on the first voice frame segment to obtain a first recognition result; in response to the first recognition result not matching a target content and a plurality of tokens in the first recognition result meeting a preset condition, performing frame compensation on the first voice frame segment to obtain a second voice frame segment; and performing voice recognition on the second voice frame segment to obtain a second recognition result, wherein a matching degree between the second recognition result and the target content is greater than a matching degree between the first recognition result and the target content.

According to a second aspect of the disclosure, an electronic device includes a microphone configured to collect a voice signal, a processor and a memory for storing instructions that when executed by the processor, control the processor to: signal-process the collected voice signal to obtain a first voice frame segment; perform voice recognition on the first voice frame segment to obtain a first recognition result; in response to the first recognition result not matching a target content and a plurality of tokens in the first recognition result meeting a preset condition, perform frame compensation on the first voice frame segment to obtain a second voice frame segment; and perform voice recognition on the second voice frame segment to obtain a second recognition result, wherein a matching degree between the second recognition result and the target content is greater than a matching degree between the first recognition result and the target content.

According to a third aspect of the disclosure, a non-transitory computer-readable storage medium has instructions stored thereon. When the instructions are executed by a processor in an electronic device, a voice processing method is implemented. The method includes: collecting a voice signal by a microphone of an electronic device, and signal-processing the collected voice signal to obtain a first voice frame segment; performing voice recognition on the first voice frame segment to obtain a first recognition result; in response to the first recognition result not matching a target content and a plurality of tokens in the first recognition result meeting a preset condition, performing frame compensation on the first voice frame segment to obtain a second voice frame segment; and performing voice recognition on the second voice frame segment to obtain a second recognition result, wherein a matching degree between the second recognition result and the target content is greater than a matching degree between the first recognition result and the target content.

It should be understood that the above general description and the following detailed description are only exemplary and explanatory, which cannot limit the disclosure.

BRIEF DESCRIPTION OF THE DRAWINGS

The accompanying drawings herein are incorporated into the specification and constitute a part of the specification, show embodiments in conformity with embodiments of the disclosure, and explain the principle of the disclosure together with the specification.

DETAILED DESCRIPTION

Exemplary embodiments will be described in detail herein, examples of which are illustrated in the accompanying drawings. When the following description refers to the accompanying drawings, unless otherwise indicated, the same numbers in different drawings represent the same or similar elements. The implementations described in the following exemplary embodiments do not represent all implementations consistent with the disclosure. On the contrary, they are only examples of apparatuses and methods consistent with some aspects of the disclosure.

Figure 1:
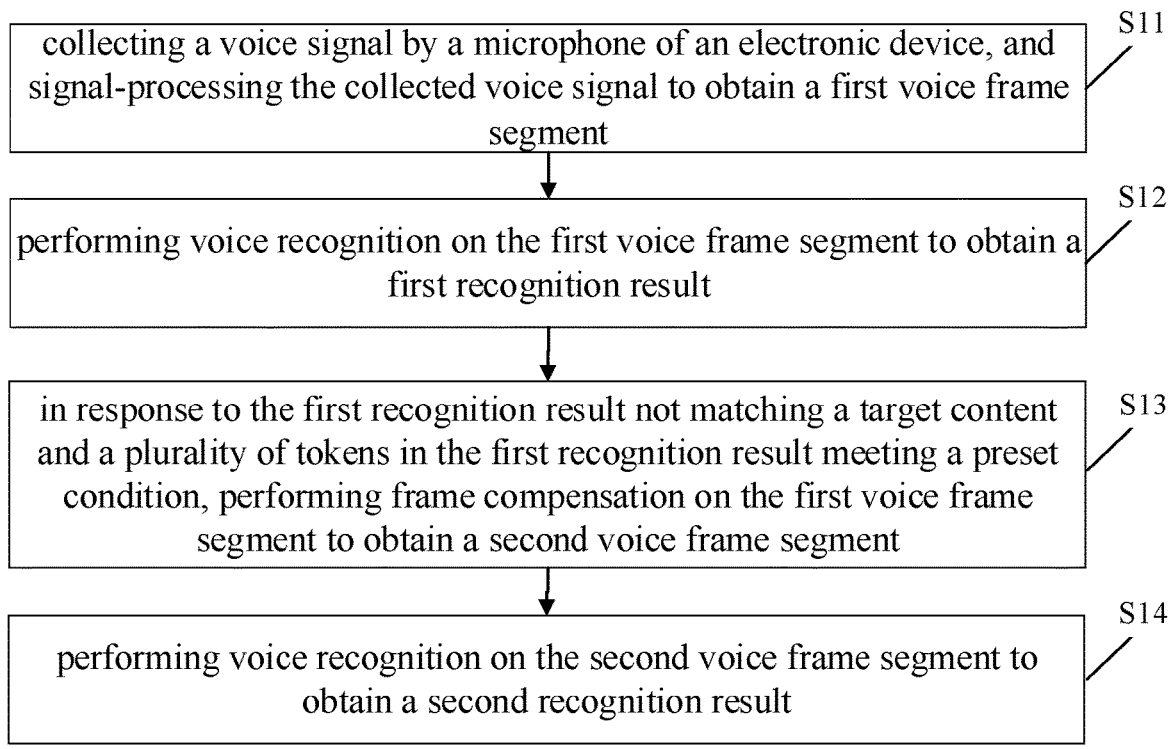
FIG. 1 is a schematic flowchart illustrating a voice processing method according to an embodiment of the disclosure.

FIG. 1 is a schematic flowchart illustrating a voice processing method according to an embodiment of the disclosure. As illustrated in FIG. 1, the voice processing method in the embodiment of the disclosure includes the following processing actions.

In block S11, a voice signal is collected by a microphone of an electronic device and the signal processing of the collected voice signal is performed to obtain a first voice frame segment.

The voice processing method in the embodiment of the disclosure is suitable for the field of voice recognition, especially suitable for the voice wake-up application field. Applicable electronic devices include smart speakers, robots, mobile phones, wearable devices, smart homes, and car navigation devices. Electronic devices supporting voice functions employ the voice wake-up technology as the beginning or entrance of human-machine interaction. The user may set different wake-up keywords for the electronic device. When the users need to wake up the electronic device, the users may wake up the electronic device only by saying specific wake-up keywords. In the embodiment of the disclosure, the wake-up keywords may be three to four syllables. The wake-up keywords covering more syllables with a large syllable difference has a better wake-up effect.

In the embodiment of the disclosure, a voice signal in the environment may be collected by a built-in microphone of the electronic device, etc., and the signal processing of the collected voice signal may be performed, such as a voice activity detection (VAD) processing. That is, a boundary detection is performed on the collected voice signal, with the purpose of accurately positioning the start and end points of the voice from a sound signal stream, so that the silence contained in the voice may be separated from the actual voice to generate the first voice frame segment. Here, the first voice frame segment includes a plurality of tokens, in which the token refers to an element in a sequence of voice character strings into which the voice frame segment is segmented. In other words, said element in the sequence of voice character strings may be called as a token or a word. In the embodiment of the disclosure, the elements in the sequence of voice character strings are phonemes with a certain meaning. As an implementation, the unit of each token may be a word, a phone, initials and finals, a monophone, a triphone and so on.

In block S12, voice recognition on the first voice frame segment is performed to obtain a first recognition result.

In the embodiment of the disclosure, after the VAD processing is performed on the collected voice signal, the voice recognition may be initiated to obtain the corresponding recognition result.

In block S13, in response to the first recognition result not matching a target content and a plurality of tokens in the first recognition result meeting a preset condition, frame compensation is performed on the first voice frame segment to obtain a second voice frame segment.

In the embodiment of the disclosure, after the first voice frame segment is recognized, it is necessary to determine whether the recognized result matches the target content, that is, to recognize whether the first voice frame segment contains relevant voice instructions. For example, it is recognized whether the first voice frame segment includes wake-up keywords, so that the electronic device is awakened based on the wake-up keywords so as to further receive the voice or operation instructions input by the user.

For example, when the wake-up keywords are set to "What's the weather like today", if the VAD voice frame segment given by the front-end voice signal processing only contains "What's the weather", the recognition result "What's the weather" after the voice recognition process is determined as a part of the wake-up keywords, which may lead to an unsuccessful wake-up of the electronic device.

Figure 2:
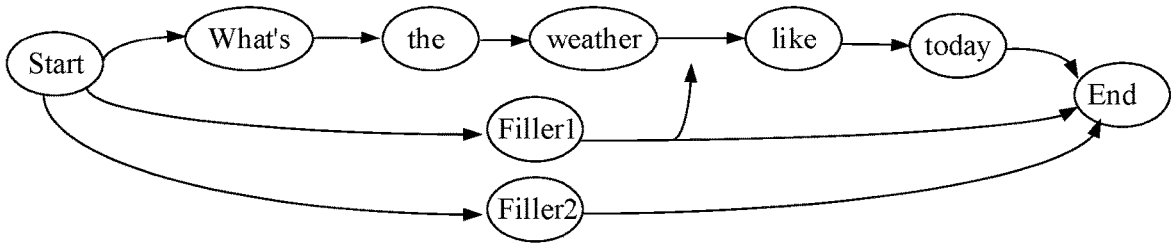
FIG. 2 is a schematic diagram illustrating a process for recognizing a first voice frame segment according to an embodiment of the disclosure.

As illustrated in FIG. 2, when the recognition of the VAD voice frame segment ends, it is found that the recognition result does not match the wake-up keywords. There are no wake-up keywords, which means that there is an error in the filler path. It may be necessary to discard the recognition result and wait for the next voice recognition. In the embodiment of the disclosure, for this situation, when it is determined that the first recognition result does not match the target content, it is further determined whether the tokens in the first recognition result meet a preset condition. If the preset condition is met, the first voice frame segment is compensated to obtain a second voice frame segment. Then voice recognition is performed on the second voice frame segment again to determine whether the recognition result of the second voice frame segment includes the wake-up keywords.

In the embodiment of the disclosure, the tokens in the first recognition result meeting the preset condition includes: at least one token whose matching probability is greater than a first set threshold in the first recognition result. As illustrated in FIG. 2, when the voice frame segment only contains "What's the weather", it is further judged whether the matching probability of the token in the voice frame segment is high. If the matching probability of the token exceeds the first set threshold such as 75%, it is considered that since the current voice frame segment may be truncated by the VAD processing, it is necessary to compensate the voice frame segment, and the recognition is then performed.

Alternatively, the tokens in the first recognition result meeting the preset condition includes: a number of tokens in the first recognition result whose matching probability to the target content is greater than a second set threshold exceeding a third set threshold. As illustrated in FIG. 2, when the voice frame segment only contains "What's the weather", it is further judged whether the matching probability of the token in the voice frame segment is high. If the matching probability of the token is greater than the second set threshold such as 50% and the number of tokens whose probability is greater than the second set threshold reaches 2 or more (or the number of tokens whose probability is greater than the second set threshold exceeds more than half of the number of wake-up keywords), it is considered that since the current voice frame segment may be truncated by the VAD processing, it is necessary to compensate the voice frame segment, and the recognition is then performed.

The unit of each token in the embodiment of the disclosure may include at least one of: a word, a phone, a monophone, and a triphone. The monophone is a single phoneme of each token and the triphone is a sequence of three phonemes of each token.

In the embodiment of the disclosure, compensating the first voice frame segment to obtain the second voice frame segment includes: estimating a frame length compensated for the first voice frame segment according to a length of historical target content counted; determining a next voice frame segment adjacent to the first voice frame segment in the collected voice signal, obtaining a third voice frame segment corresponding to the frame length from a start position of the next voice frame segment, and splicing the third voice frame segment behind the first voice frame segment to form the second voice frame segment.

As an implementation, a total length of the preset wake-up keywords and a length of its corresponding voice frame segment may be counted to determine whether the length of the currently recognized voice frame segment is less than an average length of historical wake-up keywords. If so, the length of the currently recognized voice frame segment is compensated based on the counted average length of historical wake-up keywords. Alternatively, it is determined whether the currently recognized voice frame segment is compensated only based on the average length of the voice frame segment for the wake-up keywords currently stored in the electronic device, and compensation length of the voice frame segment is also to be determined. When it is determined that the currently recognized voice frame segment is necessary to compensate and the compensation length is also determined, the next voice frame segment adjacent to the currently recognized voice frame segment after the VAD processing is found in the collected voice signal. Then a voice frame segment with the determined compensation length is extracted from the start position of the next voice frame segment. The compensation may be also performed based on the token unit in the voice frame segment. That is, within the compensation length range, a length of phonemes containing the complete token units is extracted from the next voice frame segment. The extracted voice frame segment is spliced behind the currently recognized voice frame segment, so as to form a new voice frame segment. The compensated voice frame segment is recognized to determine whether it includes the wake-up keywords.

In the embodiment of the disclosure, performing compensation on the first voice frame segment to obtain the second voice frame segment may further include: determining a next voice frame segment in the collected voice signal adjacent to the first voice frame segment, obtaining a fourth voice frame segment corresponding to a set frame length from a start position of the next voice frame segment, and splicing the fourth voice frame segment behind the first voice frame segment to form the second voice frame segment.

As an implementation, for the wake-up keywords, the set length is basically identical. That is, when the wake-up keywords are set too long, there is a possibility for a plurality of truncations and it is not convenient to improve the speed of voice recognition. When the wake-up keywords are set too short, many false wake-ups may occur. Therefore, the wake-up keywords are generally set to 2 to 6 words, for example, 4 words. Therefore, in the embodiment of the disclosure, when it is determined that the wake-up keywords are not recognized from the first voice frame segment, the first voice frame segment may be compensated based on the generally set length (i.e., 4 words) of the voice frame segment. Alternatively, a compensation length may be directly set for the first voice frame segment based on experience, and the voice compensation may be performed directly based on the set compensation length when the wake-up keywords are wrongly recognized from the first voice frame segment. The next voice frame segment adjacent to the currently recognized voice frame segment after the VAD processing is found in the collected voice signal. Then a voice frame segment with a corresponding compensation length is obtained by extracting from the start position of the next voice frame segment based on the determined compensation length or the preset compensation length, and the corresponding compensation length of voice frame segment is spliced behind the currently recognized voice frame segment to form a new voice frame segment. The compensated voice frame segment is recognized to determine whether it includes the wake-up keywords. Here, the corresponding compensation length of voice frame segment may be intercepted from the start position of the next voice frame segment based on the token unit in the voice frame segment.

That is, within the determined compensation length range, a length of phonemes containing the complete token units is extracted from the next voice frame segment, so as to ensure that the second voice frame segment contains the complete wake-up keywords and avoid insufficient compensation of the voice frame segment.

In the embodiment of the disclosure, the first voice frame segment that fails in voice recognition is compensated to avoid the voice input interruption of the user or the missed recognition of keywords in the collected voice signal caused by the VAD processing, thereby improving the detection accuracy of wake-up keywords and improving the user experience for use of electronic device.

In block S14, voice recognition is performed on the second voice frame segment to obtain a second recognition result.

A matching degree between the second recognition result and the target content is greater than a matching degree between the first recognition result and the target content. The matching degree is a value indicating a cross-correlation between the recognition result and the target content. The matching degree may be quantized in various numerical forms. For example, the matching degree may be quantized to be a percentage value of 90%.

In the embodiments of the disclosure, the target content may be standard wake-up keywords input by the user into the electronic device, such as standard wake-up keywords "What's the weather like today" set in the electronic device. The target content may be the voice content itself or may be the text content corresponding to the wake-up keywords after voice recognition, etc. When there are wake-up keywords matching the target content in the voice signal to be recognized, the electronic device will respond to the wake-up instruction corresponding to the wake-up keywords. That is, the electronic device may update from a dormant state to a wake-up state, to receive other instructions or operation inputs from the user.

It continues to perform voice recognition on the second voice frame segment compensated to determine whether the second voice frame segment includes wake-up keywords. As illustrated in FIG. 2, if the wake-up keywords such as "What's the weather like today" are recognized after compensation for the first voice frame segment, a wake-up operation on the electronic device is initiated to further receive related operations from the user for running. If the recognition of the second voice frame segment still fails after compensation, that is, the wake-up keywords are not recognized, the current processing is ended and the electronic device still maintains the current state such as in the dormant state.

In the embodiments of the disclosure, not only the voice frame segment to be recognized is compensated, but also noises in the voice frame segment are avoided. That is, it is necessary to determine a suitable recognition position for the voice frame segment to be recognized. The voice recognition is performed from a non-noise or non-silent position to avoid recognizing noise as much as possible or avoid the voice to be recognized that uses a large amount of noises as wake-up keywords. In the embodiment of the disclosure, before recognizing the first voice frame segment, it may further include: a detection unit, configured to detect whether a phoneme is a filler phoneme and/or a silent phoneme starting from the first phoneme of the first voice frame segment, skip the phoneme and perform voice recognition on the first voice frame segment when it is determined that a probability of the phoneme being the filler phoneme and/or the silent phoneme is greater than a probability of the phoneme being other phoneme. That is, the filler phoneme and/or the silent phoneme are directly skipped, and the first voice frame segment is then recognized.

Figure 3:
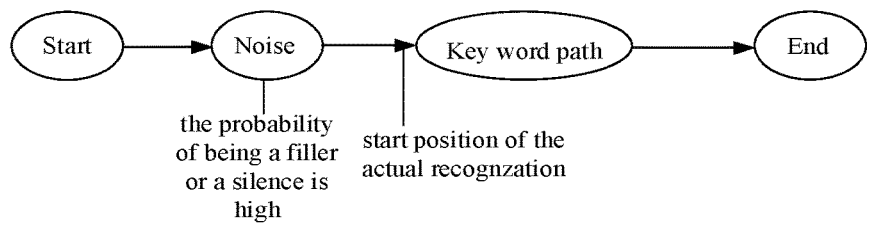
FIG. 3 is a schematic diagram illustrating a start position of recognizing a first voice frame segment according to an embodiment of the disclosure.

FIG. 3 is a schematic diagram illustrating a start position of recognizing the first voice frame segment according to the embodiment of the disclosure. As illustrated in FIG. 3, for the first voice frame segment, the voice recognition is not performed from the first position in the embodiment of the disclosure. Instead, forward prediction is performed starting from a first phoneme of the first voice frame segment, to detect whether a phoneme is a filler phoneme and/or a silent phoneme. Among the predicted phoneme probabilities, if a probability of a phoneme being the silence or filler is much greater than a probability of the phoneme being other phoneme, it may be determined that the beginning of the first voice frame segment currently given contains non-human voice segments, which may be caused by other noise introduction. In the embodiment of the disclosure, these voice segments need to be skipped and the token passing is not performed on the word graph. Specifically, the phoneme is predicted for the VAD given by the voice signal processing module, and a condition for token passing is set. For example, if the probability of the phoneme in the voice frame segment is greater than that of the filler and silence up to a certain set value, a decoding process is started; otherwise, the prediction of subsequent phonemes has been continued. In the above example with the wake-up keywords "What's the weather like today", it is set that the probability of word "today" is greater than that of the filler and silence up to 10%, this phoneme is determined as a valid one for further decoding and recognition. By further recognizing the filler and silence in the first voice frame segment, the keyword recognition of noises in the collected voice frame segment is avoided, and the efficiency of voice recognition is improved.

The embodiments of the disclosure perform effective phoneme compensation for the voice frame segment that fails to be decoded and recognized, thereby greatly improving the accuracy of detecting the wake-up keywords in the voice, and improving the user experience of voice wake-up. Furthermore, the embodiments of the disclosure effectively avoid the situation where there are other noises before the wake-up keywords given by the VAD, which reduces the interference in the decoding and recognition process and improves the overall wake-up rate of electronic device.

Figure 4:
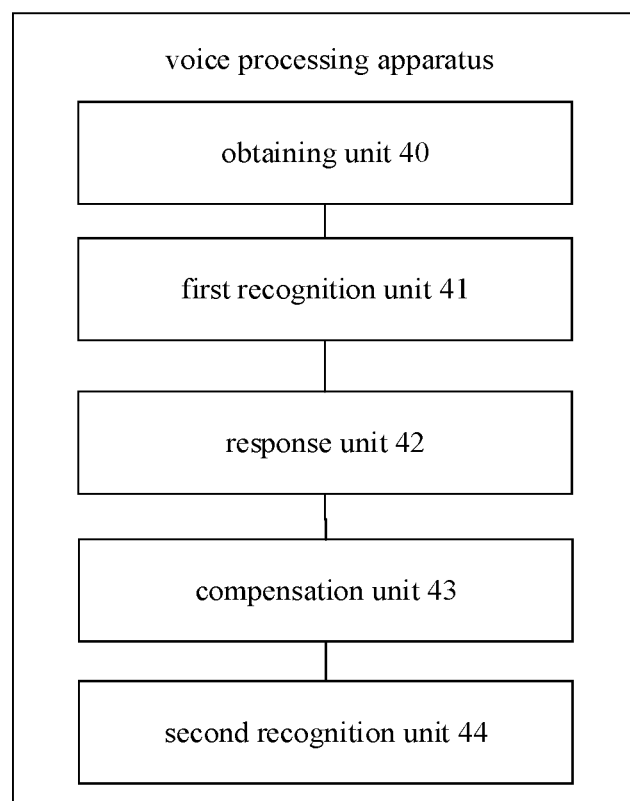
FIG. 4 is a structural schematic diagram illustrating the composition of a voice processing apparatus according to an embodiment of the disclosure.

FIG. 4 is a structural schematic diagram illustrating the composition of a voice processing apparatus according to an embodiment of the disclosure. As illustrated in FIG. 4, the voice processing apparatus illustrated in the embodiment of the disclosure includes an obtaining unit 40, a first recognition unit 41, a response unit 42, a compensation unit 43 and a second recognition unit 44.

The obtaining unit 40 is configured to signal-process a collected voice signal to obtain a first voice frame segment. The first recognition unit 41 is configured to perform voice recognition on the first voice frame segment to obtain a first recognition result. The response unit 42 is configured to trigger a compensation unit in response to the first recognition result not matching a target content and a plurality of tokens in the first recognition result meeting a preset condition. The compensation unit 43 is configured to perform frame compensation on the first voice frame segment to obtain a second voice frame segment. The second recognition unit 44 is configured to perform voice recognition on the second voice frame segment to obtain a second recognition result. A matching degree between the second recognition result and the target content is greater than a matching degree between the first recognition result and the target content.

in some embodiment, the tokens in the first recognition result meeting a preset condition includes: at least one token in the first recognition result whose matching probability is greater than a first set threshold; or a number of tokens in the first recognition result whose matching probability to the target content is greater than a second set threshold exceeding a preset number.

In some embodiment, the compensation unit 43 is further configured to: estimate a frame length compensated for the first voice frame segment according to a length of historical target content counted; and determine a next voice frame segment in the collected voice signal adjacent to the first voice frame segment, obtain a third voice frame segment corresponding to the frame length from a start position of the next voice frame segment, and splice the third voice frame segment behind the first voice frame segment to form the second voice frame segment.

In some embodiment, the compensation unit 43 is further configured to: determine a next voice frame segment in the collected voice signal adjacent to the first voice frame segment, obtain a fourth voice frame segment corresponding to a set frame length from a start position of the next voice frame segment, and splice the fourth voice frame segment behind the first voice frame segment to form the second voice frame segment.

Based on the voice processing apparatus illustrated in FIG. 4, the voice processing apparatus in the embodiment of the disclosure further includes a detection unit (not shown in FIG. 4). The detection unit is configured to detect whether a phoneme is a filler phoneme and/or a silent phoneme starting from the first phoneme of the first voice frame segment, trigger the first recognition unit 41 to skip the phoneme and perform voice recognition on the first voice frame segment when it is determined that a probability of the phoneme being the filler phoneme and/or the silent phoneme is greater than a probability of the phoneme being other phoneme.

In some embodiment, a unit of the token includes at least one of a word, a phone, a monophone and a triphone.

In an exemplary embodiment, the obtaining unit 40, the first recognition unit 41, the response unit 42, the compensation unit 43, the second recognition unit 44 and the detection unit may be implemented by one or more central processing units (CPU), graphics processing units (GPU), baseband processors (BP), application specific integrated circuits (ASIC), digital signal processing (DSP), programmable logic devices (PLD), complex programmable logic devices (CPLD), field-programmable gate arrays (FPGA), general-purpose processors, controllers, microcontroller units (MCU), a microprocessors or other electronic elements, may also be implemented in combination with one or more radio frequency (RF) antennas to execute the aforementioned voice processing methods and data interactions.

In the embodiments of the disclosure, the specific manners in which various modules and units in the voice processing apparatus illustrated in FIG. 4 perform operations have been described in detail in the method embodiments, which will not be elaborated here.

Figure 5:
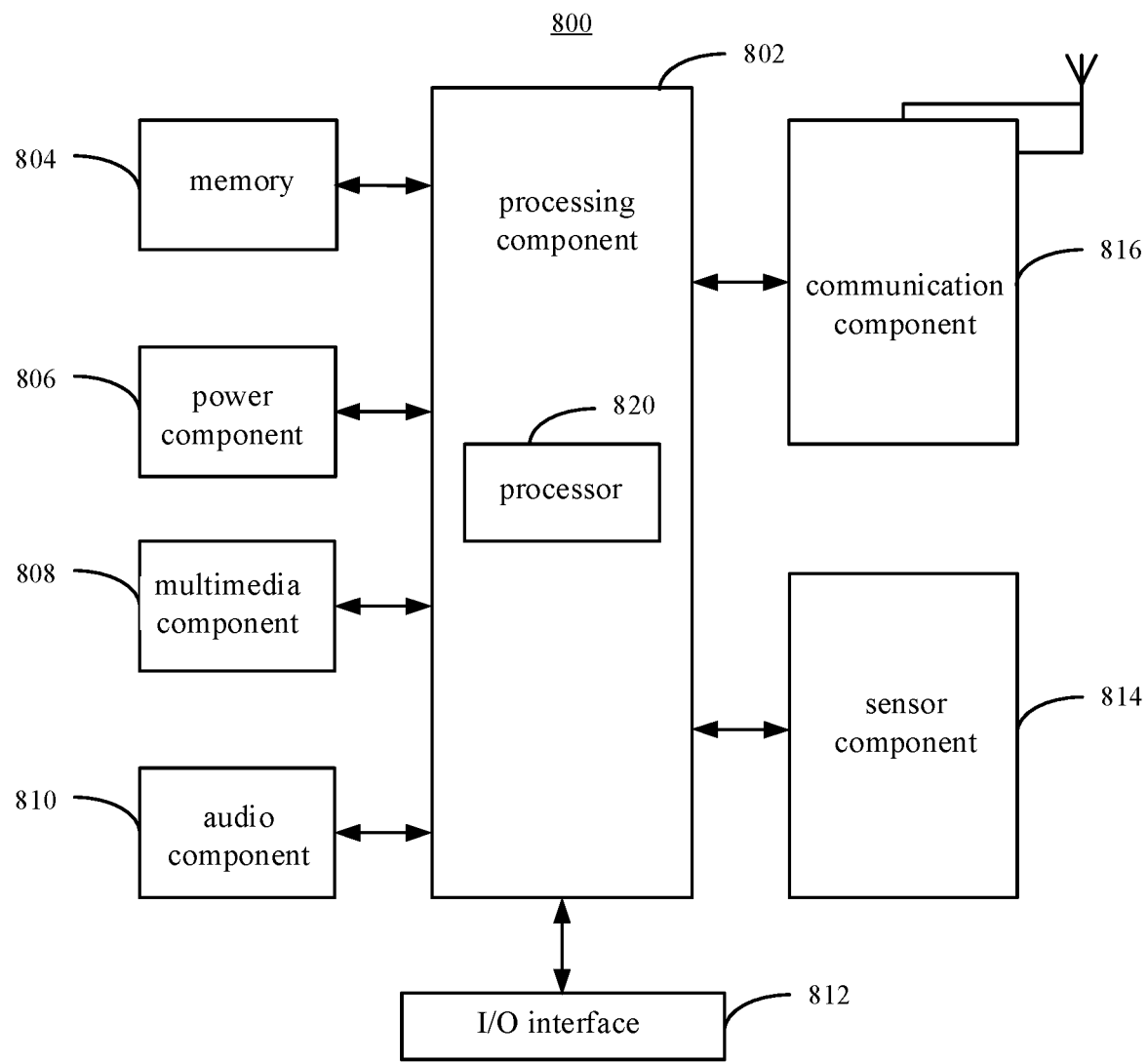
FIG. 5 is block diagram illustrating an electronic device according to an embodiment of the disclosure.

FIG. 5 is a block diagram illustrating an electronic device 800 according to an exemplary embodiment. As illustrated in FIG. 5, the electronic device 800 supports multi-screen output. The electronic device 800 may include one or more of the following components: a processing component 802, a memory 804, a power supply component 806, a multimedia component 808, an audio component 810, an input/output (I/O) interface 812, a sensor component 814, and a communication component 816.

The processing component 802 typically controls the overall operations of the electronic device 800, such as the operations associated with display, telephone calls, data communications, camera operations, and recording operations. The processing component 802 may include one or more processors 820 to execute instructions to perform all or part of the steps of the methods described in the above embodiments. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support operations in the electronic device 800. Examples of such data include instructions for any application or method operating on the electronic device 800, contact data, phone book data, messages, pictures, videos, etc. The memory 804 may be implemented by any type of volatile or nonvolatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 806 provides power to various components of the electronic device 800. The power supply component 806 may include a power management system, one or more power sources, and other components associated with the generation, management, and distribution of power for the electronic device 800.

The multimedia component 808 includes a screen that provides an output interface between the electronic device 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of the touch or slide action, but also sense a period of time and a pressure associated with the touch or swipe action. In some embodiments, the multimedia component 808 includes a front camera and/or a rear camera. The front camera and the rear camera may receive an external multimedia datum while the electronic device 800 is in an operation mode, such as a photographing mode or a video mode. Each of the front camera and rear camera may be a fixed optical lens system or have focus and optical zoom capability.

The audio component 810 is configured to output and/or input audio signals. For example, the audio component 810 includes a microphone (MIC) configured to receive an external audio signal when the electronic device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and the peripheral interface module. The peripheral interface module may be a keyboard, a click wheel, a button, and the like. These buttons may include but are not limited to, a home button, a volume button, a starting button, and a locking button.

The sensor component 814 includes one or more sensors for providing the electronic device 800 with various aspects of state evaluation. For example, the sensor component 814 may detect an open/closed state of the electronic device 800, relative positioning of components, e.g., the display and the keypad, of the electronic device 800, a change in position of the electronic device 800 or a component of the electronic device 800, a presence or absence of user contact with the electronic device 800, an orientation or an acceleration/deceleration of the electronic device 800, and a change in temperature of the electronic device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the electronic device 800 and other devices. The electronic device 800 may access a wireless network based on a communication standard, such as Wi-Fi, 2G or 3G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In an exemplary embodiment, the electronic device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for implementing the voice processing methods described in the above embodiments.

In exemplary embodiments, there is also provided a non-transitory computer-readable storage medium including instructions, such as instructions stored in memory 804, that when executed by processor 820 in the electronic device 800, control the processor to perform the methods described in the above embodiments. For example, the non-transitory computer-readable storage medium may be a ROM, a RAM, a CD-ROM, a magnetic tape, a floppy disc, an optical data storage device, and the like.

The embodiments of the disclosure also provide a non-transitory computer-readable storage medium. When the instructions in the storage medium are executed by a processor of the electronic device, the electronic device may execute the voice processing method of the foregoing embodiments. The method includes signal-processing a collected voice signal to obtain a first voice frame segment; performing voice recognition on the first voice frame segment to obtain a first recognition result; in response to the first recognition result not matching a target content and a plurality of tokens in the first recognition result meeting a preset condition, performing frame compensation on the first voice frame segment to obtain a second voice frame segment; and performing voice recognition on the second voice frame segment to obtain a second recognition result, wherein a matching degree between the second recognition result and the target content is greater than a matching degree between the first recognition result and the target content.

Those skilled in the art will easily think of other embodiments of the disclosure after considering the description and practicing the invention disclosed herein. The disclosure is intended to cover any variations, uses, or adaptive changes of the present invention which follow the general principles of the disclosure and include common knowledge or conventional technical means in the art not disclosed in the disclosure. The description and the embodiments are to be regarded as exemplary only, and the true scope and spirit of the disclosure are indicated in the following claims.

It should be understood that the disclosure is not limited to the precise structure described above and illustrated in the drawings, and various modifications and changes may be made without departing from its scope. The scope of the present invention is only limited by the appended claims.

What is claimed is:

1. A voice processing method, comprising:
   collecting a voice signal by a microphone of an electronic device, and performing voice activity detection (VAD) processing of the collected voice signal to obtain a first voice frame segment;
   detecting whether a phoneme is a filler phoneme starting from the first phoneme of the first voice frame segment, wherein the filler phoneme indicates non-keywords;
   in response to determining that a probability of the phoneme being the filler phoneme is greater than a probability of the phoneme being not the filler phoneme, skipping the filler phoneme and performing voice recognition on the first voice frame segment to obtain a first recognition result;
   in response to the first recognition result not matching a target content and a number of tokens in the first recognition result whose matching probability to the target content is greater than a second set threshold exceeding a preset number, determining that there is a VAD processing truncation in the first voice frame segment;
   in response to the VAD processing truncation in the first voice frame segment,
      estimating a target frame length compensated for the first voice frame segment according to a length of historical target content counted,
      determining a next voice frame segment in the collected voice signal adjacent to the first voice frame segment,
      obtaining, in the collected voice signal, a third voice frame segment having the target frame length and including complete token units, from a start position of the next voice frame segment, and
      obtaining a second voice frame segment by splicing the third voice frame segment behind the first voice frame segment; and
   performing voice recognition on the second voice frame segment to obtain a second recognition result, wherein a matching degree between the second recognition result and the target content is greater than a matching degree between the first recognition result and the target content.

2. The method of claim 1, wherein obtaining the second voice frame segment comprises:
   obtaining a fourth voice frame segment having a set frame length and including complete token units from a start position of the next voice frame segment, and obtaining the second voice frame segment by splicing the fourth voice frame segment behind the first voice frame segment.

3. The method of claim 1, wherein a unit of each token of the plurality of tokens comprises at least one of a word, a phone, a monophone and a triphone.

4. An electronic device, comprising:
   a microphone configured to collect a voice signal;
   a processor; and
   a memory storing instructions that when executed by the processor, control the processor to perform voice activity detection (VAD) processing of the collected voice signal to obtain a first voice frame segment;
   detect whether a phoneme is a filler phoneme starting from the first phoneme of the first voice frame segment, wherein the filler phoneme indicates non-keywords;
   in response to determining that a probability of the phoneme being the filler phoneme is greater than a probability of the phoneme being not the filler phoneme, skip the filler phoneme and perform voice recognition on the first voice frame segment to obtain a first recognition result;
   in response to the first recognition result not matching a target content and a number of tokens in the first recognition result whose matching probability to the target content is greater than a second set threshold exceeding a preset number, determine that there is a VAD processing truncation in the first voice frame segment;
   in response to the VAD processing truncation in the first voice frame segment,
      estimate a target frame length compensated for the first voice frame segment according to a length of historical target content counted,
      determine a next voice frame segment in the collected voice signal adjacent to the first voice frame segment,
      obtain, in the collected voice signal, a third voice frame segment having the target frame length and including complete token units, from a start position of the next voice frame segment, and
      obtain a second voice frame segment by splicing the third voice frame segment behind the first voice frame segment; and
   perform voice recognition on the second voice frame segment to obtain a second recognition result, wherein a matching degree between the second recognition result and the target content is greater than a matching degree between the first recognition result and the target content.

5. The device of claim 4, wherein the processor is further configured to:
   obtain a fourth voice frame segment having a set frame length and including complete token units from a start position of the next voice frame segment, and obtain the second voice frame segment by splicing the fourth voice frame segment behind the first voice frame segment.

6. The device of claim 4, wherein a unit of each token of the plurality of tokens comprises at least one of a word, a phone, a monophone and a triphone.

7. A non-transitory computer-readable storage medium having instructions stored thereon, when the instructions are executed by a processor in an electronic device, a voice processing method is implemented, the method comprising:
  collecting a voice signal by a microphone of an electronic device, and performing voice activity detection (VAD) processing of the collected voice signal to obtain a first voice frame segment;
  detecting whether a phoneme is a filler phoneme starting from the first phoneme of the first voice frame segment, wherein the filler phoneme indicates non-keywords;
  in response to determining that a probability of the phoneme being the filler phoneme is greater than a probability of the phoneme being not the filler phoneme, skipping the filler phoneme and performing voice recognition on the first voice frame segment to obtain a first recognition result;
  in response to the first recognition result not matching a target content and a number of tokens in the first recognition result whose matching probability to the target content is greater than a second set threshold exceeding a preset number, determining that there is a VAD processing truncation in the first voice frame segment;
  in response to the VAD processing truncation in the first voice frame segment,
    estimating a target frame length compensated for the first voice frame segment according to a length of historical target content counted,
    determining a next voice frame segment in the collected voice signal adjacent to the first voice frame segment,
    obtaining, in the collected voice signal, a third voice frame segment having the target frame length and including complete token units, from a start position of the next voice frame segment, and
    obtaining a second voice frame segment by splicing the third voice frame segment behind the first voice frame segment; and
  performing voice recognition on the second voice frame segment to obtain a second recognition result, wherein a matching degree between the second recognition result and the target content is greater than a matching degree between the first recognition result and the target content.

8. The method of claim 7, wherein obtaining the second voice frame segment comprises:
  obtaining a fourth voice frame segment having a set frame length and including complete token units from a start position of the next voice frame segment, and obtaining the second voice frame segment by splicing the fourth voice frame segment behind the first voice frame segment.

9. The method of claim 7, wherein a unit of each token of the plurality of tokens comprises at least one of a word, a phone, a monophone and a triphone.

* * * * *